(12) United States Patent
Hatcher et al.

(10) Patent No.: US 9,097,861 B2
(45) Date of Patent: Aug. 4, 2015

(54) SUBSEA OPTICAL CONNECTOR USING MULTIPLE SEALS

(71) Applicants: Jonathan Hatcher Hatcher, South Daytona, FL (US); Justin Kretschmar, Port Orange, FL (US); Alan McCleary, St. Augustine, FL (US); Corey Williams, Port Orange, FL (US); Daniel Hawkins, Ormond Beach, FL (US)

(72) Inventors: Jonathan Hatcher Hatcher, South Daytona, FL (US); Justin Kretschmar, Port Orange, FL (US); Alan McCleary, St. Augustine, FL (US); Corey Williams, Port Orange, FL (US); Daniel Hawkins, Ormond Beach, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 14/569,107

(22) Filed: Dec. 12, 2014

(65) Prior Publication Data
US 2015/0168654 A1    Jun. 18, 2015

Related U.S. Application Data

(60) Provisional application No. 61/915,464, filed on Dec. 12, 2013.

(51) Int. Cl.
*G02B 6/38* (2006.01)
*G02B 6/50* (2006.01)

(52) U.S. Cl.
CPC .......... *G02B 6/3816* (2013.01); *G02B 6/3826* (2013.01); *G02B 6/506* (2013.01)

(58) Field of Classification Search
CPC .............................. G02B 6/3816; G02B 6/506
USPC .............................. 385/55, 56, 58, 70, 73, 75
See application file for complete search history.

(56) References Cited

U.S. PATENT DOCUMENTS

| 5,738,535 A * | 4/1998 | Cairns ........................... 439/138 |
| 7,004,638 B2 * | 2/2006 | Nicholson ....................... 385/53 |
| 2008/0205831 A1 * | 8/2008 | Prel et al. ....................... 385/111 |
| 2015/0036986 A1 * | 2/2015 | Kretschmar et al. ............ 385/94 |

\* cited by examiner

*Primary Examiner* — Ryan Lepisto
(74) *Attorney, Agent, or Firm* — Valenti, Hanley & Robinson, PLLC; Kevin T. Duncan

(57) ABSTRACT

The present invention provides optical connectors and optical feedthrough systems that can be mated and unmated in a harsh environment, such as underwater, and is particularly concerned with a method and apparatus for securing and sealing an optical feedthrough or connector from the surrounding turbid environment.

19 Claims, 14 Drawing Sheets

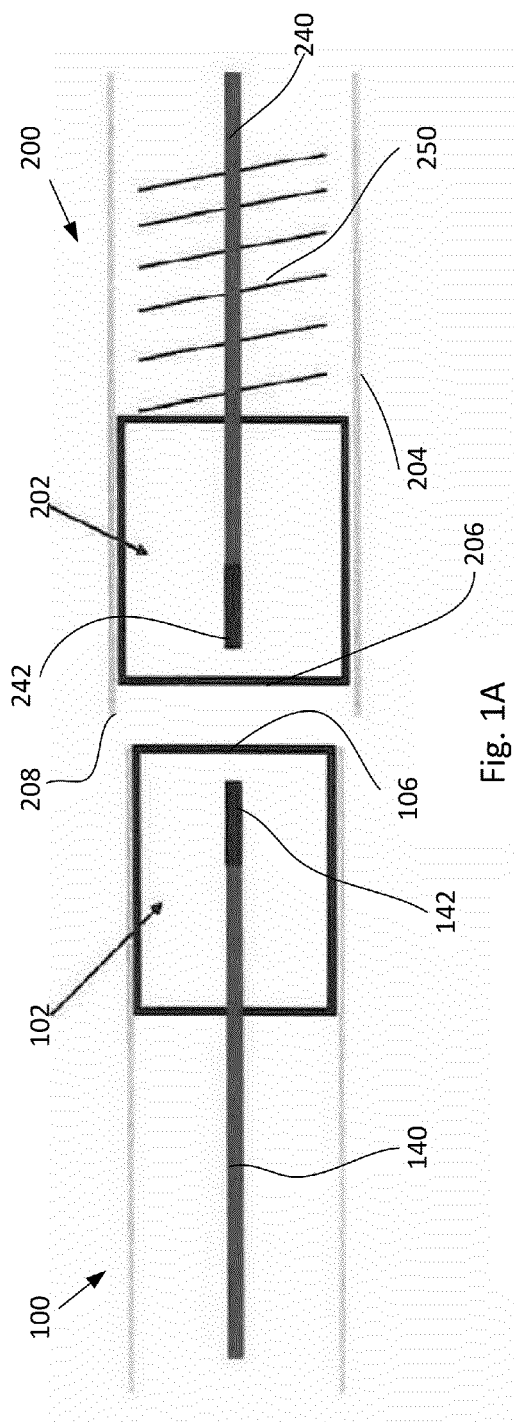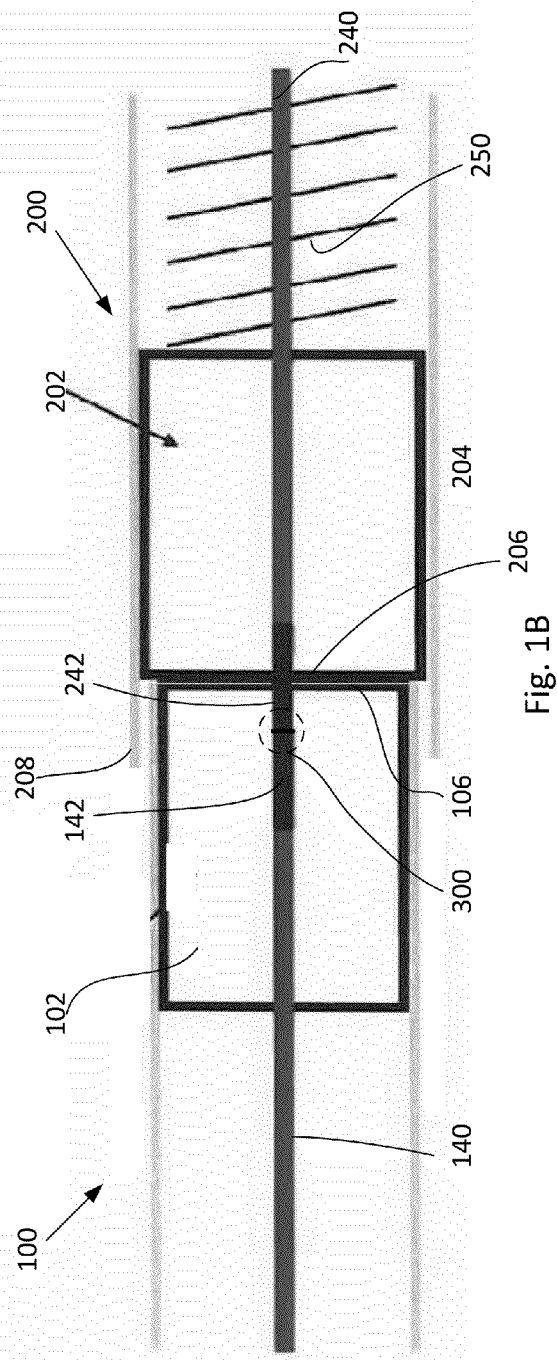
Fig. 1A
Fig. 1B

SUBSEA OPTICAL CONNECTOR USING MULTIPLE SEALS

CROSS REFERENCE TO RELATED APPLICATION

The present invention claims benefit of priority to U.S. Prov. Pat. App. No. 61/915,464, entitled SUBSEA OPTICAL CONNECTOR USING PRIMARY, SECONDARY, AND TERTIARY SEALS, filed on Dec. 12, 2013, (Hatcher et al.) and is incorporated by reference herein in its entirety.

FIELD OF THE INVENTION

The present invention relates generally to connectors or optical feedthrough systems which can be mated and unmated in a harsh environment, such as oceanic, underwater, corrosive environments at great depths. The invention is particularly concerned with a method and apparatus for securing and sealing an optical feedthrough or connector from the surrounding turbid environment.

BACKGROUND OF THE INVENTION

In offshore drilling and production operations, equipment are often subjected to harsh conditions thousands of feet under the sea surface with working temperatures of −50° F. to 350° F. with pressures of up to 15,000 psi. Subsea control and monitoring equipment commonly are used in connection with operations concerning the flow of fluid, typically oil or gas, out of a well. Flow lines are connected between subsea wells and production facilities, such as a floating platform or a storage ship or barge. Subsea equipment include sensors and monitoring devices (such as pressure, temperature, corrosion, erosion, sand detection, flow rate, flow composition, valve and choke position feedback), and additional connection points for devices such as down hole pressure and temperature transducers. A typical control system monitors, measures, and responds based on sensor inputs and outputs control signals to control subsea devices. For example, a control system attached to a subsea tree controls down-hole safety valves. Functional and operational requirements of subsea equipment have become increasingly complex along with the sensing and monitoring equipment and control systems used to insure proper operation.

To connect the numerous and various sensing, monitoring and control equipment necessary to operate subsea equipment, harsh-environment connectors are used with electrical cables, optical fiber cables, or hybrid electro-optical cables. Initial demand for subsea connector development was in connection with military applications. Over time demand for such connectors has grown in connection with offshore oil industry applications.

Early underwater connectors were electrical "dry-mate" devices, intended to be mated prior to immersion in the sea and were of two principal types: rubber-molded "interference fit" type and rigid-shell connectors. The rubber molded "interference-fit" connectors depended on receptacles with elastic bores that stretched and sealed over mating plugs. The rigid-shell connectors had mating parts sealed together via O-rings or other annular seals.

Ocean Design, Inc. has been an industry leader in the development of subsea connectors and applications. Dr. James Cairns' article Hybrid Wet-Mate Connectors: 'Writing the Next Chapter', Sea Technology, published July 1997, provides a thorough discussion of the history of underwater connectors through to 1997, and is a source for this background summary. In the early 1960s, electrical connectors intended for mating and de-mating underwater came into use. These so called "wet-mate" connectors were adaptations of the interference-fit dry-mate versions, and were designed so that when mated, the water contained in the receptacle bores would be substantially expelled prior to sealing. Also during this time, the first oil-filled and pressure-balanced electrical connector designs were introduced. These isolated the receptacle contacts within sealed oil-chambers which, during engagement, were penetrated by elongated pins with insulated shafts. Connection was, therefore, accomplished in the benign oil, not in harsh seawater. Unlike previous connector types which could not be disengaged at even modest depths, pressure balancing type connectors could be actuated anywhere in the sea. These wet-mate oil-filled connectors eventually became the high-reliability standard for the offshore oil industry. One critical design element of oil-filled connectors is providing seals that allow the oil chambers to be penetrated repeatedly without losing the oil or allowing seawater intrusion. One design widely used for electrical applications accomplishes this through the use of dielectric pistons, one of which resides in each receptacle socket. Each piston has a spring which biases it outward to automatically fill the socket's end-seal when the plug pin is withdrawn. During mating the pins push these pistons back through the oil-chamber ports (which they have kept sealed) and onward deep inside the sockets.

Early subsea wet-mate optical connectors passed only one optical circuit and used expanded-beam lenses or fiber-to-fiber physical contact junctions. To protect the optical interfaces, both the plug and receptacle contacts were housed in oil-filled chambers which were pressure balanced to the environment. Problems with this design included that sealing and cleanliness were not adequate to provide desired reliability. The spring/piston concept used for sealing electrical connectors is not effective for optical connectors as pistons get in the way of the light path. A second type of subsea-mateable optical connector consisted basically of dry-mate connectors which had a bit of optical index-matching gel placed in the contact interfaces. The excess gel was expelled upon mating. There was no attempt to exclude sand or silt from the interfaces, and the resulting performance was left to chance. Hybrid wet-mate devices were an attempt to combine oil-filled and pressure-balanced plug and receptacle housings with means for sealing and maintaining cleanliness of the optical interfaces. Within both, plug and receptacle, oil chambers, groups of contact junctions are aligned behind cylindrical rubber face-seals. When mated, opposed plug and receptacle seals first press against each other like the wringers of an old-fashioned washing machine, forcing the water out from between them. As the mating sequence continues the opposed plug and receptacle seals, like the wringers, roll in unison and transport any debris trapped between them off to the side. The action simultaneously causes clean, sealed, oil-filled passages to open between opposed plug and receptacle contact junctions. Continuing the mating process, plug pins advance through the sealed passages to contact sockets within the receptacle. De-mating is the reverse sequence. In the case of electrical circuits each mated pin/socket junction is contained in an individual, secondary, sealed oil chamber within the common oil volume. The contacts are unexposed to environmental conditions before, during and after mating.

There are many types of connectors for making electrical and fiber-optic cable connections in hostile or harsh environments, such as undersea or submersible connectors which can be repeatedly mated and de-mated underwater at great ocean depths. Current underwater connectors typically comprise releasably mateable plug and receptacle units, each containing one or more electrical or optical contacts or junctions for engagement with the junctions in the other unit when the two units are mated together. Each of the plug and receptacle units or connector parts is attached to cables or other devices intended to be joined by the connectors to form completed circuits. To completely isolate the contacts to be joined from the ambient environment, one or both halves of these connectors house the contacts in oil-filled, pressure-balanced chambers—this is referred to as a pressure balanced set-up. Such devices are often referred to as "wet-mate" devices and often are at such great depths that temperature and other environmental factors present extreme conditions for materials used in such devices. The contacts on one side (plug) are in the form of pins or probes, while the contacts or junctions on the other side (receptacle) are in the form of sockets for receiving the probes.

Typically, the socket contacts are contained in a sealed chamber containing a dielectric fluid or other mobile substance, and the probes enter the chamber via one or more sealed openings. Such wet-mate devices have previously been pressure compensated. One major problem in designing such pressure compensated or pressure balanced units is the performance and longevity of seals required to exclude seawater and/or contaminates from the contact chamber after repeated mating and de-mating.

Both the plug and receptacle halves of most fiber-optical connectors which are mateable in a harsh environment have oil-filled chambers. The chambers are typically brought face-to-face during an early step of the mating sequence. In a subsequent mating step, one or more connective passages, sealed from the outside environment, are created between the chambers of the mating connector halves. The passages join the two oil-filled chambers, creating a single, connected oil volume. Actual connection of the contact junctions then takes place within the common oil chamber. Examples of prior pressure compensated wet-mate devices are described in U.S. Pat. Nos. 4,616,900; 4,682,848; 5,838,857; 6,315,461; 6,736,545; and 7,695,301.

In some known underwater electrical connectors, such as that described in U.S. Pat. Nos. 4,795,359 and 5,194,012 of Cairns, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in a straightforward way for an optical connector since the optical contacts must be able to engage axially for practical purposes.

U.S. Pat. No. 4,666,242 of Cairns describes an underwater electro-optical connector in which the male and female connector units are both oil filled and pressure balanced. This device utilizes a penetrable seal element having an opening which pinches closed when the units are separated and seals against the entering probe when mated. Other known fiber-optic connectors have similar seals which are not suitable for use under some conditions and may tend to lose effectiveness after repeated mating and de-mating.

Other known seal mechanisms involve some type of rotating seal element along with an actuator for rotating the seal element between a closed, sealed position when the units are unmated, and an open position when the units are mated, allowing the contact probes to pass through the seal elements into the contact chambers. Such connectors are described, for example, in U.S. Pat. Nos. 5,685,727 and 5,738,535 of Cairns. These overcome some of the reliability problems of penetrable seals, for example, but can be too complex for miniaturized connectors.

Most existing wet-mate connectors of the pressure compensation-type depend on elastomers, which have several known disadvantages and which only grow as required temperature and pressure performance in the operating environments increase. Above 350° F. in particular, but at lower temperatures as well, elastomers in seawater degrade rapidly, and can fail due to numerous causes, including: rupture; rapid gas decompression (RGD) embolisms; leakage; melting; and gas permeation. Materials science has advanced to create new materials capable of functioning and lasting in harsher environments, but the industry is moving towards temperature regimes at or in excess of 400° F., where even the newest materials will be stressed to or beyond their limits.

Other pressure compensation systems typically rely on metal bellows, which have different weaknesses. At the scale of ever-smaller optical feedthrough systems, where diameters of compensation systems are typically less than an inch, the metal of the bellows are extraordinarily thin, and the welded joints may be subject to fatigue, opening up failure pathways similar to those of elastomers. One primary concern with deployable embodiments of wet-mate devices regarding pressure compensation is the use of elastomeric hoses. Operators experience signal loss on gas and gas-lift wells during start up and shutdown. At these events the gas functions in the well are dynamic and not at equilibrium. In addition, pressure compensated systems in gaseous environments have experienced complete loss of pressure compensation and infiltration of seawater into spaces that should be dielectrically insulated by oil.

Thus, common underwater connectors comprise releasably, mateable plug and receptacle units, each containing one or more electrical or optical contacts or junctions for engagement with the junctions in the other unit when the two units are mated together. The contacts on one side are in the form of pins or probes, while the contacts or junctions on the other side are in the form of sockets for receiving the probes. Typically, the socket contacts are contained in a sealed chamber containing a dielectric fluid or other mobile substance, and the probes enter the chamber via one or more sealed openings. One major problem in designing such units is the provision of seals which will adequately exclude or evacuate seawater and/or contaminants from the contact chamber after repeated mating and de-mating operations.

SUMMARY OF THE INVENTION

The present invention provides a submersible or harsh environment "wet-mate" connector for use with optical or electro-optical cables having first and second connector units which are releasably mateable. Embodiments described herein provide a new subsea optical connector or Optical Feedthrough System ("OFS") having primary, secondary and tertiary seals.

In one embodiment, the OFS includes a two-part sealing mechanism, a primary seal and a secondary seal. The primary seal includes the first of the two parts designed as a primary oil containment seal. The primary seal is designed to close off a chamber containing an optically clear fluid and one or more fiber terminations or ferrules in an unmated condition. The second part of the sealing mechanism is the "secondary" seal and is designed to seal an optical fiber mating path between optical connectors from a potentially turbid outside environment. The secondary seal is further adapted to avoid and exclude built up debris on or around the connector face outside of the containment chamber where mating of the optical fiber terminations occurs. This arrangement helps in sealing the connectors for an optical stem from debris and the turbid outside environment that can potentially disrupt the operation of an optical feedthrough system.

In another embodiment, the present invention provides a wet-mateable connector assembly comprising: a receptacle having a front and a longitudinal axis extending inwardly from the front; a plug having a front, at least a portion of the plug adapted to be releasably received in the receptacle in a mating and de-mating fashion along the receptacle longitudinal axis; the receptacle further comprising: a receptacle housing forming an interior; a receptacle manifold movably disposed within the receptacle housing interior and having a first optical fiber mating path disposed therein extending inwardly from the front of the receptacle; a receptacle primary seal having a second optical fiber mating path disposed therein; and a receptacle optical fiber having a receptacle fiber contact end proximate to the receptacle front; the plug further comprising: a plug manifold having a third optical fiber mating path disposed therein extending inwardly from the front of the plug; a plug primary seal member, the plug primary seal member having a fourth optical fiber mating path disposed therein; and a plug optical fiber having a plug fiber contact end proximate to the plug front; wherein in an unmated condition the first optical fiber path and the second optical fiber path are misaligned, and the third optical fiber path and the fourth optical fiber path are misaligned; and wherein mating of the plug with the receptacle causes: the receptacle housing to engage and displace the receptacle primary seal; the second optical fiber mating path to align with the first optical fiber mating path and form a first uninterrupted optical fiber mating path extending through the receptacle manifold and the receptacle primary seal; the receptacle optical fiber to travel into and through the first uninterrupted optical fiber mating path; the receptacle housing to engage and displace the plug primary seal; the fourth optical fiber mating path to align with the third optical fiber mating path and form a second uninterrupted optical fiber mating path extending through the plug manifold and the plug primary seal; the receptacle optical fiber to travel into and through the second uninterrupted optical fiber mating path; and the receptacle fiber contact end to adjoin the plug fiber contact end to form a communication connection.

The wet-mateable connector assembly of the above embodiment may further comprise wherein the plug further comprises a secondary seal disposed intermediate of the plug front and the plug primary seal. The wet-mateable connector assembly may further comprise one or more of a tertiary seal adapted to substantially encapsulate one or both of the plug fiber contact end and the receptacle fiber contact end. The tertiary seal may further comprise an I-CONN seal. The tertiary seal may be adapted to open upon engagement of an external contact end during the mating process. One or both of the plug and the receptacle further may further comprise an oil containment vessel adjacent to, respectively, the plug primary seal and the receptacle primary seal. The receptacle may further comprise a receptacle oil containment vessel and the plug comprises a plug oil containment vessel and one or both of the receptacle and plug oil containment vessels comprise a pressure compensation bellows. One or both of the plug primary seal and the receptacle primary seal may further comprise a spring adapted to bias the respective seal to a closed position and an interrupted fiber mating path. The receptacle seal member may further comprise a spring adapted to move said receptacle seal member from said second, open position to said first, closed position. The wet-mateable connector assembly may further comprise a set of bi-directional optical penetrators. The receptacle housing may be substantially cylindrical in shape. The receptacle may further comprise an inclined ramp portion disposed in the interior and adapted to engage both the plug primary seal and the receptacle primary seal during the mating process and to disengage both the plug primary seal and the receptacle primary seal during the de-mating process.

In yet another embodiment, the present invention provides a wet-mateable connector assembly comprising: a plug adapted to mate and de-mate with a receptacle; the receptacle comprising: a receptacle housing forming an interior; a receptacle body disposed within the receptacle housing interior and linearly displaceable from a front of the receptacle and having a first optical fiber mating path disposed therein; a receptacle primary seal means having a second optical fiber mating path disposed therein; and a receptacle optical fiber having a receptacle fiber contact end proximate to the receptacle front and fixed relative to the receptacle housing; the plug comprising: a plug body having a third optical fiber mating path disposed therein extending inwardly from a front of the plug; a plug primary seal means having a fourth optical fiber mating path disposed therein; and a plug optical fiber having a plug fiber contact end proximate to the plug front and fixed relative to the plug; wherein in an unmated condition the first optical fiber path and the second optical fiber path are misaligned, and the third optical fiber path and the fourth optical fiber path are misaligned; and wherein mating of the plug with the receptacle causes: the receptacle housing to engage and displace the receptacle primary seal means and align the second optical fiber mating path with the first optical fiber mating path to form a first uninterrupted optical fiber mating path; the receptacle optical fiber to travel into and through the first uninterrupted optical fiber mating path; the receptacle housing to engage and displace the plug primary seal means and align the fourth optical fiber mating path with the third optical fiber mating path to form a second uninterrupted optical fiber mating path; the receptacle optical fiber to travel into and through the second uninterrupted optical fiber mating path; and the receptacle fiber contact end to adjoin the plug fiber contact end to form a communication connection.

The wet-mateable connector assembly of the above embodiment may further comprise wherein the plug further comprises a secondary seal disposed intermediate of the plug front and the plug primary seal means. The wet-mateable connector assembly may further comprise one or more of a tertiary seal adapted to substantially encapsulate one or both of the plug fiber contact end and the receptacle fiber contact end. One or both of the plug and the receptacle may further comprise an oil containment vessel adjacent to, respectively, the plug primary seal means and the receptacle primary seal means. The receptacle may further comprise a receptacle oil containment vessel and the plug comprises a plug oil containment vessel and one or both of the receptacle and plug oil containment vessels comprise a pressure compensation bellows. One or both of the plug primary seal means and the receptacle primary seal means may further comprise a spring adapted to bias the respective seal to a closed position and an interrupted fiber mating path. The receptacle may further comprise an inclined ramp portion disposed in the interior and adapted to engage both the plug primary seal means and the receptacle primary seal means during the mating process and to disengage both the plug primary seal means and the receptacle primary seal means during the de-mating process.

BRIEF DESCRIPTION OF THE DRAWINGS

In order to facilitate a complete understanding of the present invention, this system, and the terms used herein, reference is now made to the accompanying drawings, in which like elements are referenced with like numerals. These drawings should not be construed as limiting the present invention or system, but are exemplary and for reference.

FIGS. 1A and 1B provide an overview of an embodiment of the shuttling optical containment method according to the present invention;

DETAILED DESCRIPTION

Figure 2:
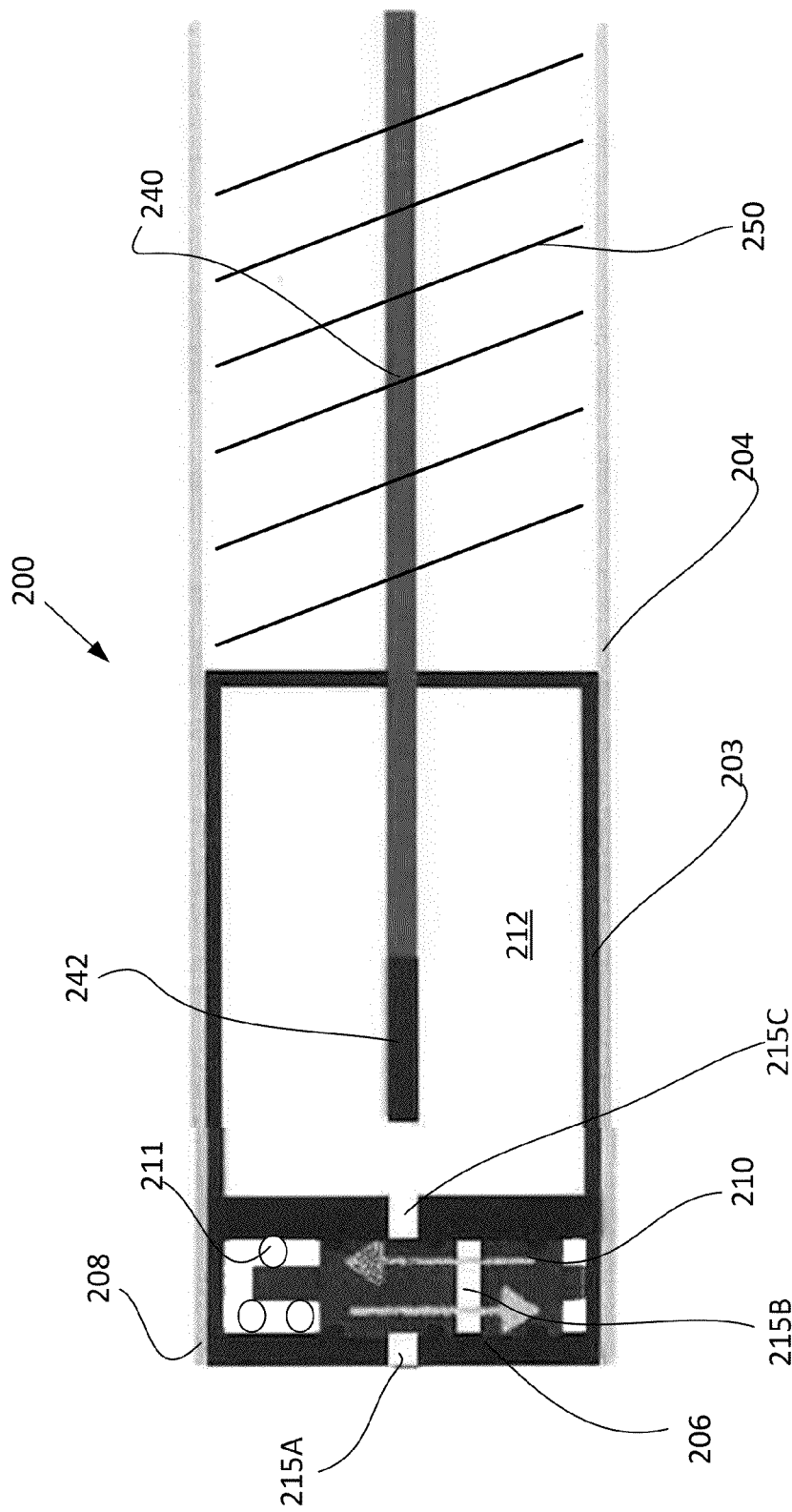
FIG. 2 provides a schematic longitudinal cross-sectional view through part of an embodiment of one connector half or unit, illustrating the mechanically actuated primary seal according to the present invention.

The present invention and system will now be described in more detail with reference to exemplary embodiments as shown in the accompanying drawings. While the present invention and system is described herein with reference to the exemplary embodiments, it should be understood that the present invention and system is not limited to such exemplary embodiments. Those possessing ordinary skill in the art and having access to the teachings herein will recognize additional implementations, modifications, and embodiments as well as other applications for use of the invention and system, which are fully contemplated herein as within the scope of the present invention and system as disclosed and claimed herein, and with respect to which the present invention and system could be of significant utility.

Certain embodiments as disclosed herein provide for a subsea optical connector assembly in which releasably, mateable connector units each have a two-part or two-stage sealing mechanism. In one embodiment, each connector unit or optical feedthrough has primary, secondary and tertiary seals. The figures and related description below, illustrate exemplary embodiments of methods, devices and systems for securing and sealing an Optical Feedthrough System ("OFS") from surrounding turbid environment, using primary, secondary and tertiary seals.

The OFS of the present invention provides a multiple stage sealing system as illustrated in the drawings for wet-mateable connectors. While the connectors illustrated in the figures may be for one of a plug or a receptacle unit, it should be understood that the improved sealing arrangement is intended for use at both the plug and receptacle connector halves. Generally, the OFS of the present invention uses a shuttling optical containment chamber to maintain a clean environment to protect the optical terminations within. This technical philosophy is similar to the Teledyne ODI rolling optical seal wet-mate connector, described in U.S. Pat. Nos. 5,738,535 and 6,017,227, for example, the contents of which are incorporated herein by reference. The OFS has optical terminations housed within a clean fluid environment which shuttles during the mating and de-mating process.

FIGS. 1A and 1B are a schematic illustration of this concept, where the plug fixed optical containment chamber or plug optical containment chamber or manifold 102 and the receptacle shuttling optical containment chamber or manifold 202 are shown, with FIG. 1A showing the unmated condition and FIG. 1B showing the mated condition. The shuttling optical containment approach allows for fiber optics to be contained in clean, optically clear fluid. Pressure compensation bellows (such as plug pressure compensation bellows 126 shown in FIG. 12 and as described below) ensure that containment chambers in both connectors are in equilibrium, so there is no exchange of fluid with the environment. Optical penetrators (such as optical penetrator 122 shown in FIG. 12 and as described below) and primary optical sealing elements (such as plug primary seal 110 shown in FIG. 4 and as described below) are all contained in the optical chamber (such as manifold 102 shown in FIG. 2) and are detailed below.

FIGS. 1A/1B illustrate a plug 100 and receptacle 200 combination in unmated (FIG. 1A) and mated (FIG. 1B) positions. The plug 100 comprises a plug manifold 102, which has a plug face 106, and also comprises a plug optical fiber stem 140 along the longitudinal axis of the plug 100, and has a plug optical fiber termination or ferrule 142. The receptacle 200 has a receptacle manifold 202 that is slidably or movably mounted in the receptacle housing 204 and spring biased forward in an unmated condition by spring 250. The receptacle optical chamber has a receptacle face 206 and the housing 204 also has a receptacle housing annular leading edge 208. The movement of the receptacle manifold 202 is regulated by the receptacle main spring 250, which is compressed as shown in FIG. 1B when under load in with the connector halves 100/200 in a mated condition. The receptacle 200 also comprises a receptacle optical fiber stem 240 along the longitudinal axis of the receptacle 200. The receptacle optical fiber stem 240 has a receptacle optical fiber termination or ferrule 242.

FIG. 2 illustrates one exemplary embodiment of the receptacle 200 component of an OFS solution having a two-part sealing mechanism, where the first of two parts is the primary oil containment seal, or receptacle primary seal 210. This primary seal 210 is designed to close off the chamber or receptacle oil containment vessel 212 containing an optically clear fluid and the fiber ferrule 242 in the unmated condition.

Figure 3:
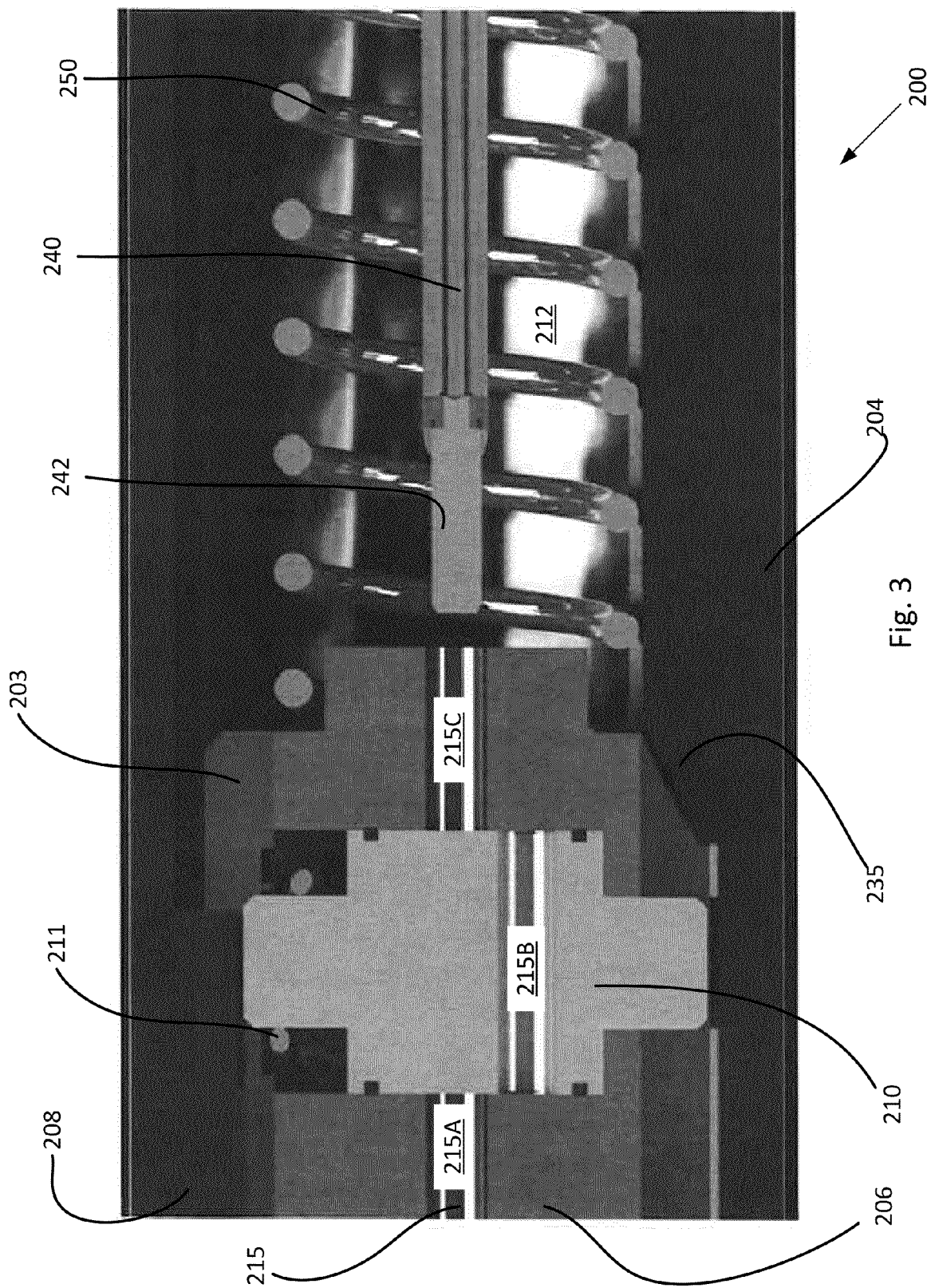
FIG. 3 provides a further view of an embodiment of the primary oil containment seal according to the present invention.
Figure 13:
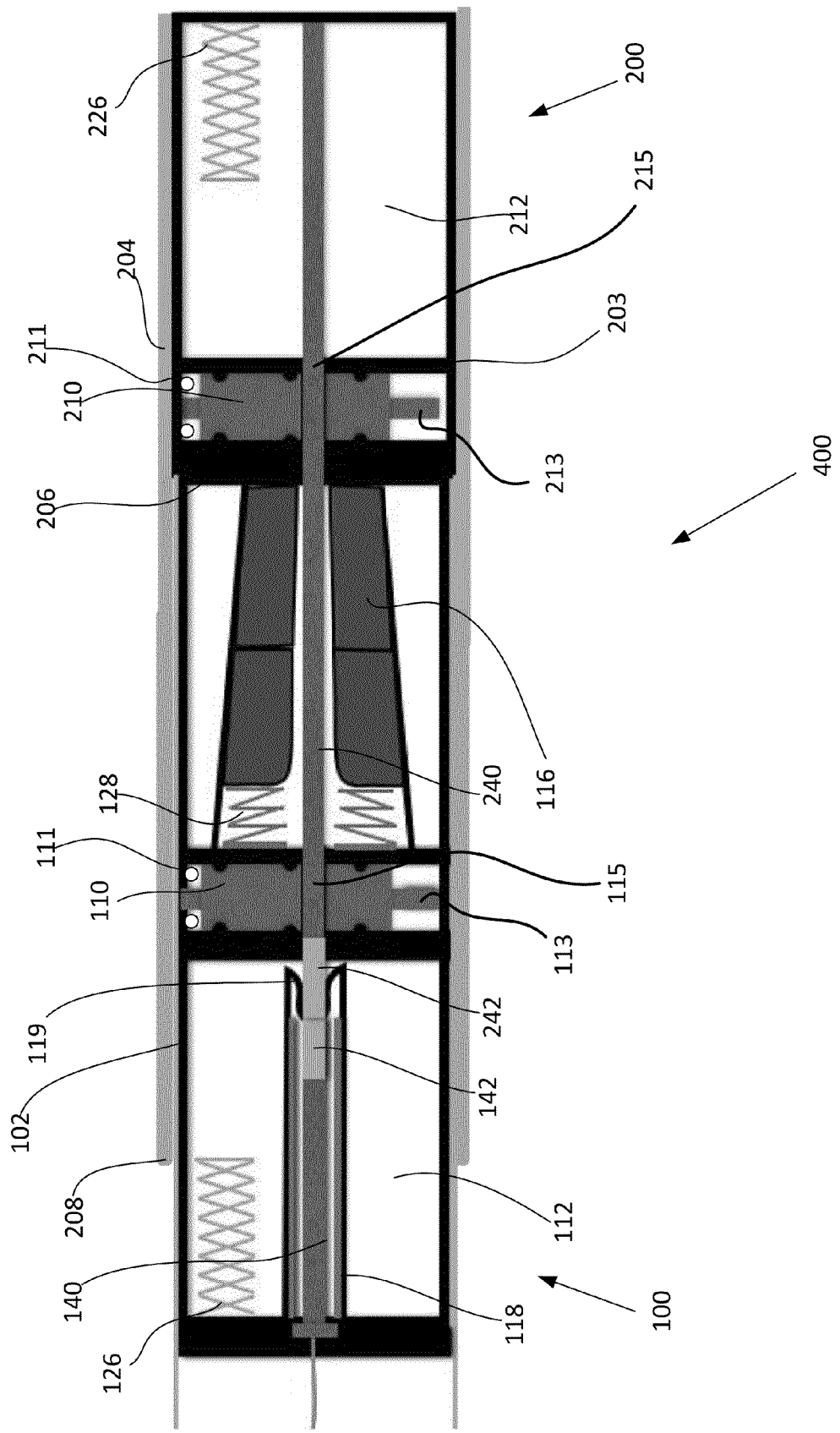
FIGS. 13 and 14 illustrate an embodiment of simplified mating between two wet mate connector halves, highlighting that the same core sealing concepts are used on both the plug and the receptacle according to the present invention.
Figure 14:
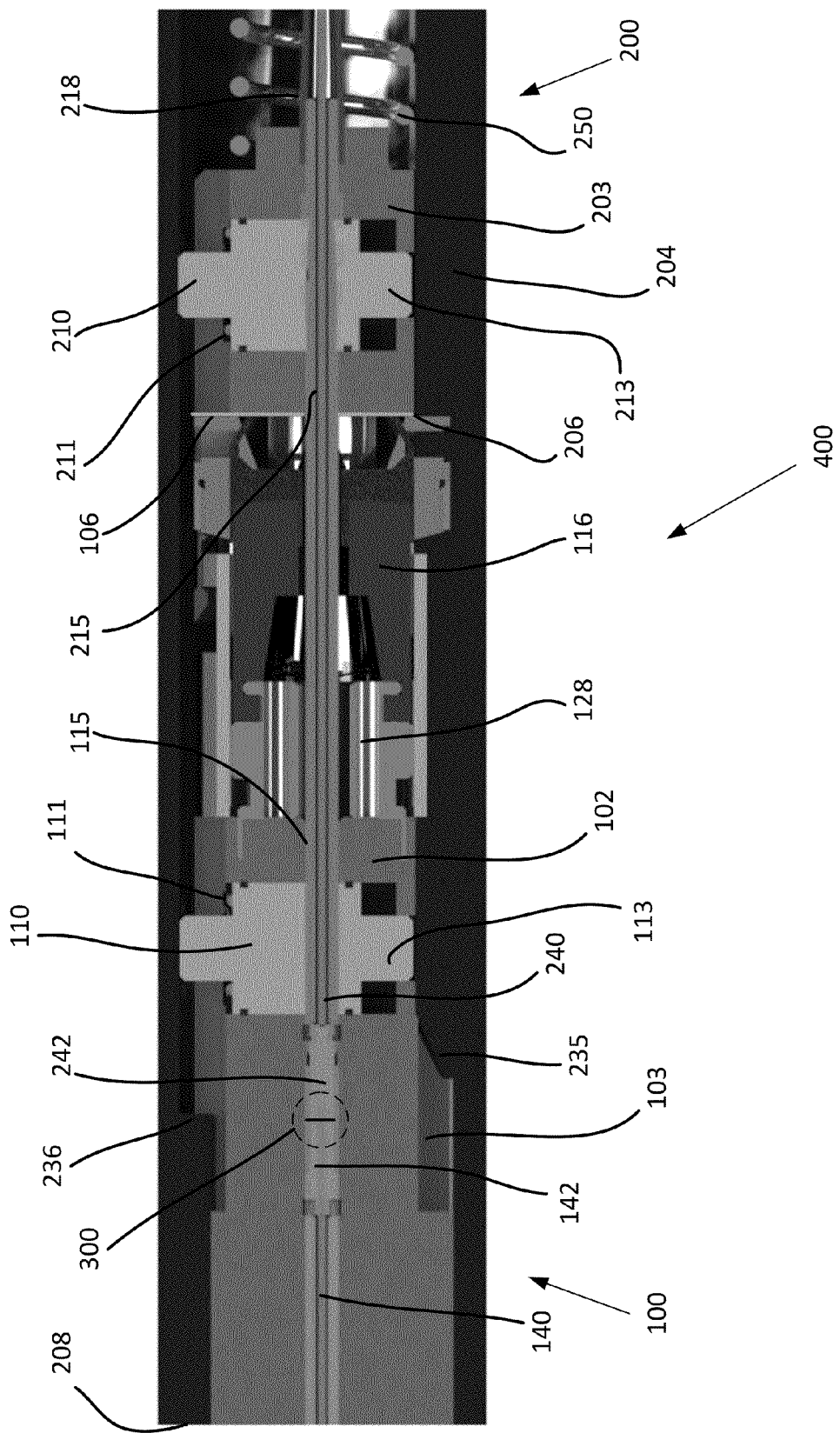

Referring now to FIGS. 2 and 3, the primary containment method for the receptacle optical containment chamber 212 comprises a cylindrical sliding plug primary seal 210. The primary function of this seal 210 is to prevent optical fluid loss from the receptacle optical oil containment vessel 212 during mating and de-mating of the plug 100 and receptacle 200. Receptacle primary seal 210 is mechanically actuated by action of a receptacle seal spring 211 and mechanical interaction with the interior wall of connector housing 204. Specifically, the receptacle housing inclined ramp or cam portion 235 acts upon the receptacle primary seal 210 to move the receptacle primary seal 210 vertically against the biasing force of the receptacle seal spring 211, causing the receptacle primary seal 210 to move into an open position such that the fiber mating path portions 215A, 215B, and 215C come into alignment to allow an uninterrupted path for receptacle fiber stem 240 and ferrule 242 to pass during mating and de-mating. Opening of the receptacle primary seal 210 only occurs during mating, i.e., when the two connector halves, plug 100 and receptacle 200, come together and seal out the environment (as illustrated in FIGS. 13 and 14). Primary seal 210 returns to a closed position during de-mating. The sliding seal 210 is actuated radially and opens and closes the pathway 215 for optical fiber stem 240 and ferrule 242 to pass through during mating and de-mating. A similar process occurs with respect to plug primary seal 110. Actuation is performed by features integral to the receptacle housing 204 such as inclined ramp or cam portion 235 along the housing 204 wall. A complimentary recess or spacing behind the receptacle forward seal stop 236 may be provided on the housing opposite ramp 235 to accommodate movement of seals 110/210. This allows for positive engagement and precise positioning during both opening and closing of the seal 210. This positive engagement and positioning also ensures that the optical fibers/stems 140 and 240 do not experience excessive side loading that could be detrimental to optical performance. Shuttling of the receptacle body 203 along the interior of the receptacle housing 204 allows for the receptacle optical fiber ferrule 242 to pass through receptacle fiber mating path 215 and the receptacle primary seal 210 once the receptacle primary seal 210 is in the open position. A receptacle seal spring 211 returns the receptacle primary seal 210 to its closed/unmated position during the de-mating process.

Figure 4:
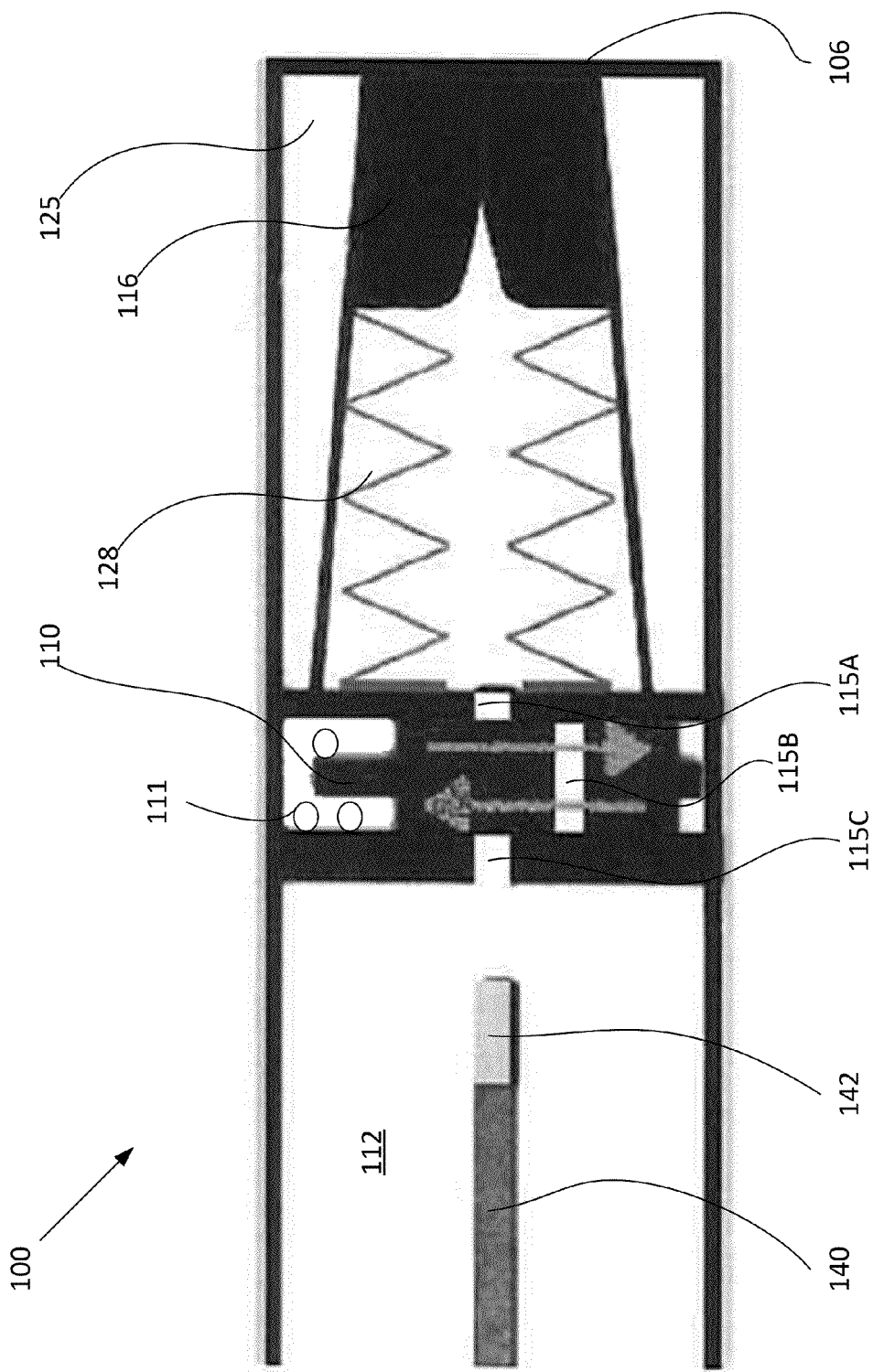
FIG. 4 provides a schematic longitudinal cross-sectional view showing an embodiment of the primary seal and the secondary seal or connector mating interface seal at the front of the connector unit according to the present invention.
Figure 5:
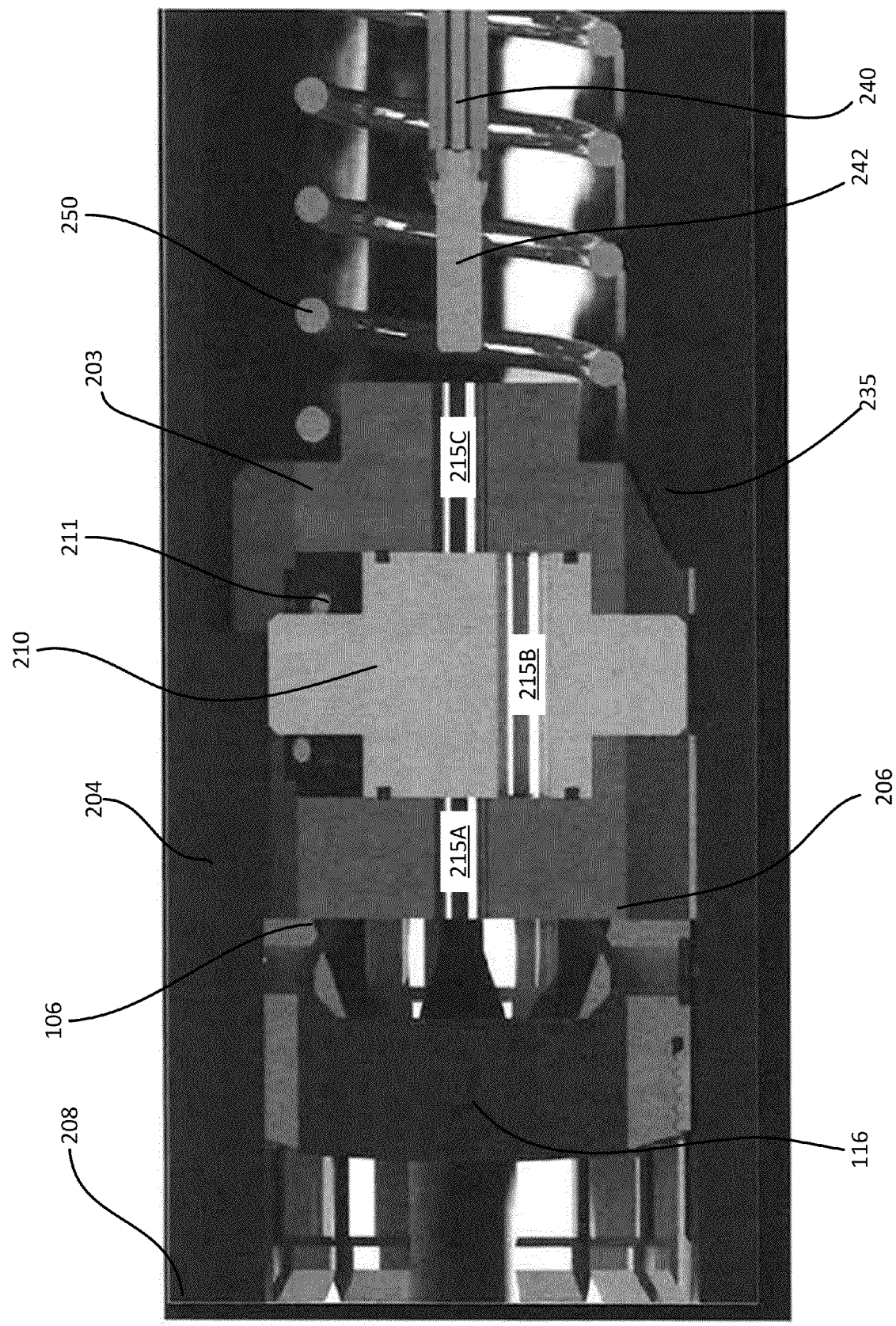
FIG. 5 provides a further view illustrating an embodiment of the connector mating interface seal according to the present invention.
Figure 6:
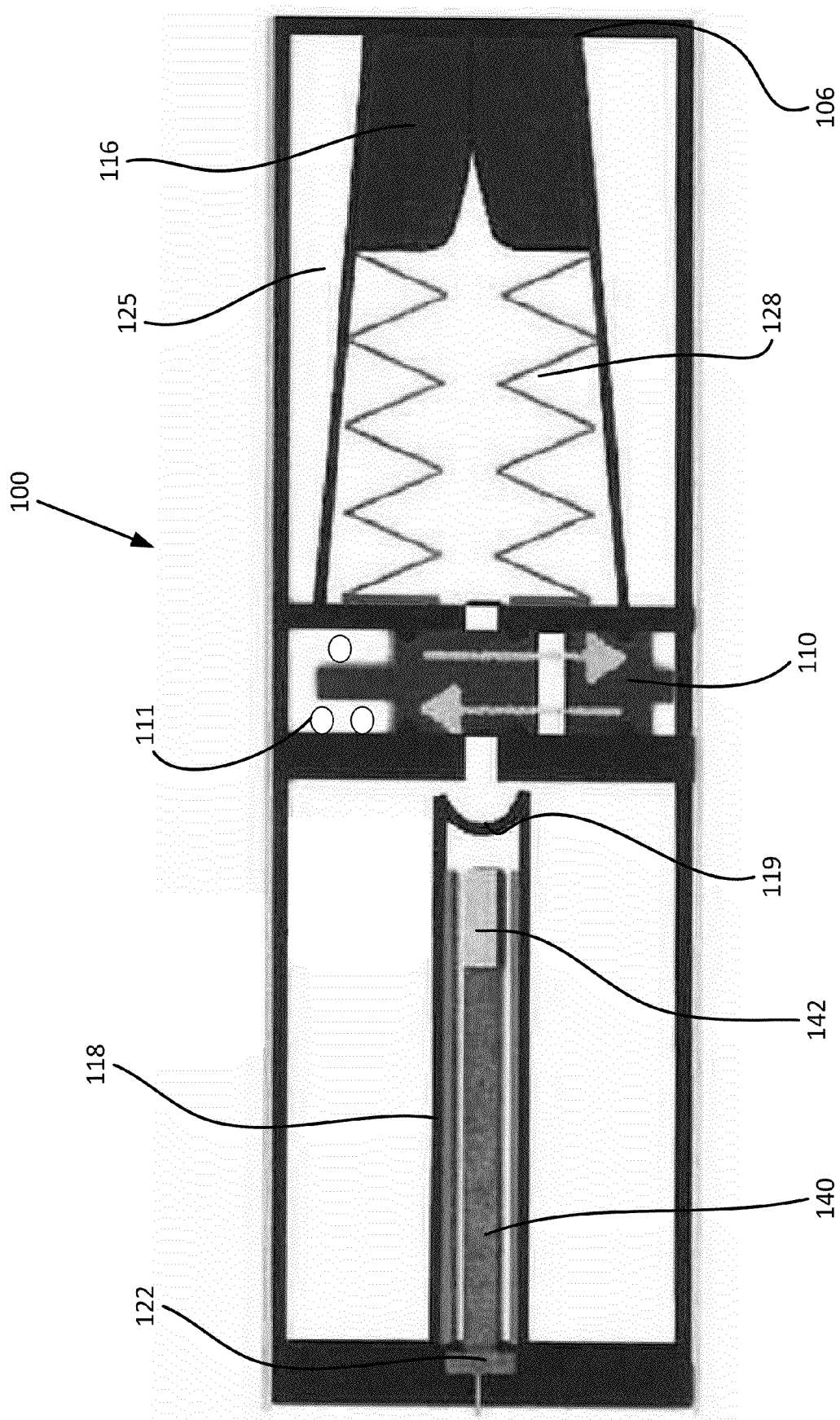
FIG. 6 provides a schematic longitudinal cross-sectional view similar to FIG. 4 but illustrating an embodiment of a secondary oil containment seal designed as a tertiary barrier around the fiber ferrule itself according to the present invention.

As shown in FIGS. 4-6, the plug 100 may have a secondary seal 116 as a second part of the sealing solution that is designed to seal the fiber mating path 115 (as shown in an interrupted state and having path portions 115A, 115B, and 115C) between the connectors from the potentially turbid outside environment. The secondary seal 116 also excludes any built-up debris on or around the connector plug face 106 outside of the manifold 102 where mating of the optical fiber ferrules 142 and 242 occurs. Additionally, the invention allows for the option of adding a tertiary seal or secondary oil containment seal 118/218 around the fiber ferrule 142/242 itself, such as the plug catheter seal 118 illustrated in FIG. 6 and the receptacle catheter seal 218 illustrated in FIG. 7 and described in more detail below.

With reference now to FIG. 4, the plug primary seal 110 for the plug manifold 102 does not have the direct function of excluding all sand/silt from the plug 100 prior to mating. The plug primary seal 110 is actuated in a similar manner to the receptacle primary seal 210. However, the plug 100 may also have the additional plug secondary seal 216. The function of excluding sand/silt from the plug 100 prior to mating may be performed by the plug secondary seal 116 at the front 106 of the plug 100, as illustrated in FIGS. 4 and 5. The plug secondary seal 116 may be an I-CONN seal, as described in U.S. Pat. No. 6,315,461 (Cairns), for example, the contents of which are incorporated herein by reference. An I-CONN seal is a large, circular elastomer seal molded with an eye-shaped slit in the center that provides a pass-through for an optical or electrical interface. Plug secondary seal 116 may be manufactured from a rapid gas decompression (RGD) resistant, low durometer, and liquid injection molded fluoroelastomer suitable for use in a high temperature/high pressure environment in which the OFS will be placed. The plug secondary seal 116 has a set of secondary seal elastomeric ribs 128 which compress to open the plug secondary seal 116 when the plug face 106 comes into mechanical contact with the receptacle face 206. The plug secondary seal 116 may also be contained in a plug forward oil containment vessel 125, which serves to further balance the pressures of the plug 100 and receptacle 200 during mating.

With reference now to FIG. 5, the plug 100 is shown in a partially mated condition with the receptacle 200. The receptacle housing front annular leading edge 208 has passed the plug face 106 and extends beyond the exterior of the plug secondary seal 116. The plug secondary seal 116 is within the receptacle housing 204 and the plug face 106 abuts the receptacle face 206. The receptacle primary seal 210 is being held in a closed position by the receptacle seal spring 211, and has not yet come into mechanical contact with the receptacle housing inclined ramp or cam portion 235. The force of plug 100 moves receptacle body 203 inwardly away from the lead edge 208 along the longitudinal axis of the receptacle 200 against the biasing force of the receptacle main spring 250 towards the receptacle optical fiber ferrule 242 of the receptacle optical fiber stem 240. In this embodiment, while the receptacle manifold 202 moves relative to housing 204, the receptacle optical fiber stem 240 is fixed relative to the housing 204.

Figure 7:
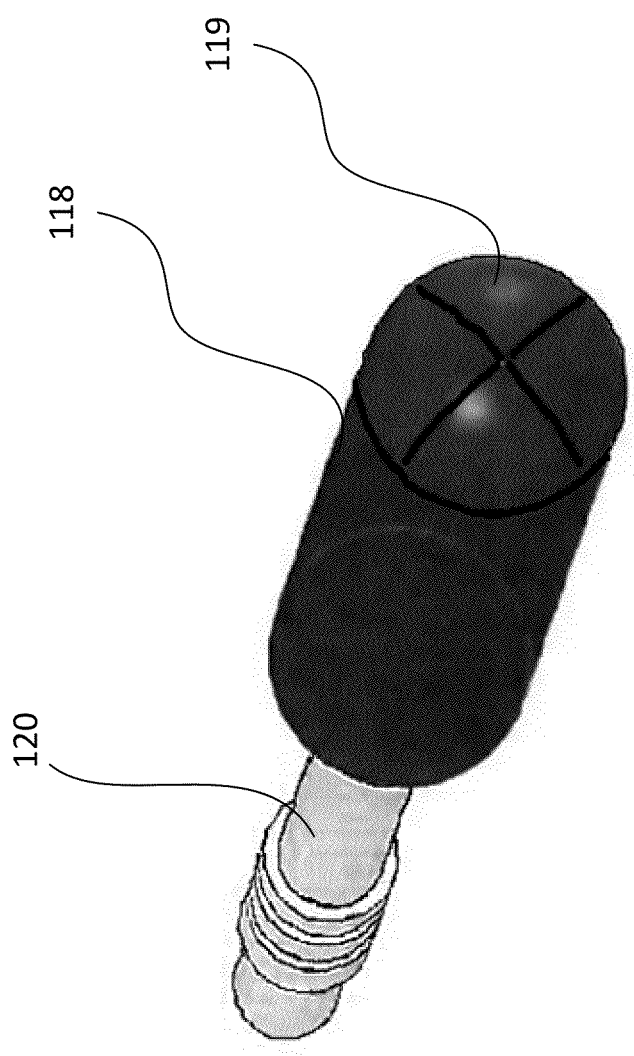
FIG. 7 provides a perspective view of an embodiment of the barrier or catheter seal of FIG. 6 installed on an optical stem according to the present invention.

A third or tertiary seal or secondary containment seal such as plug catheter seal 118 is illustrated in FIGS. 6 to 7. All three seals 110, 116, and 118 are illustrated assembled in the plug 100 in FIG. 10. The catheter-style seal 118 is designed as a tertiary barrier to provide a sand/silt seal around the plug optical fiber stem 140 and plug optical fiber ferrule 142 itself. Tertiary seal 118 provides a redundant barrier against dirt and debris that may interfere with proper mating of the optical fiber ferrules 142 and 242. The sealing mechanism of the plug catheter seal 118 is a molded elastomeric component that fits closely around fiber sheath 120. The convex end 119 of the seal 118 provides a seal until it is penetrated by the receptacle fiber ferrule 242 during mating. The act of the fiber ferrule 242 opening the end 119 of the catheter seal 118 also serves as a wiper to clean the face of the fiber during the seal actuation. Although end 119 of catheter seal 118 is convex, it is shown in FIG. 6 as concave as if mated. In operation, ferrule 242 causes the end 119 to transition from convex to concave upon deflection with a gap between the end of ferrule 142 and the end 119 of seal 118 sufficient to permit the unblocked engagement of ferrules 142 and 242.

Figure 8:
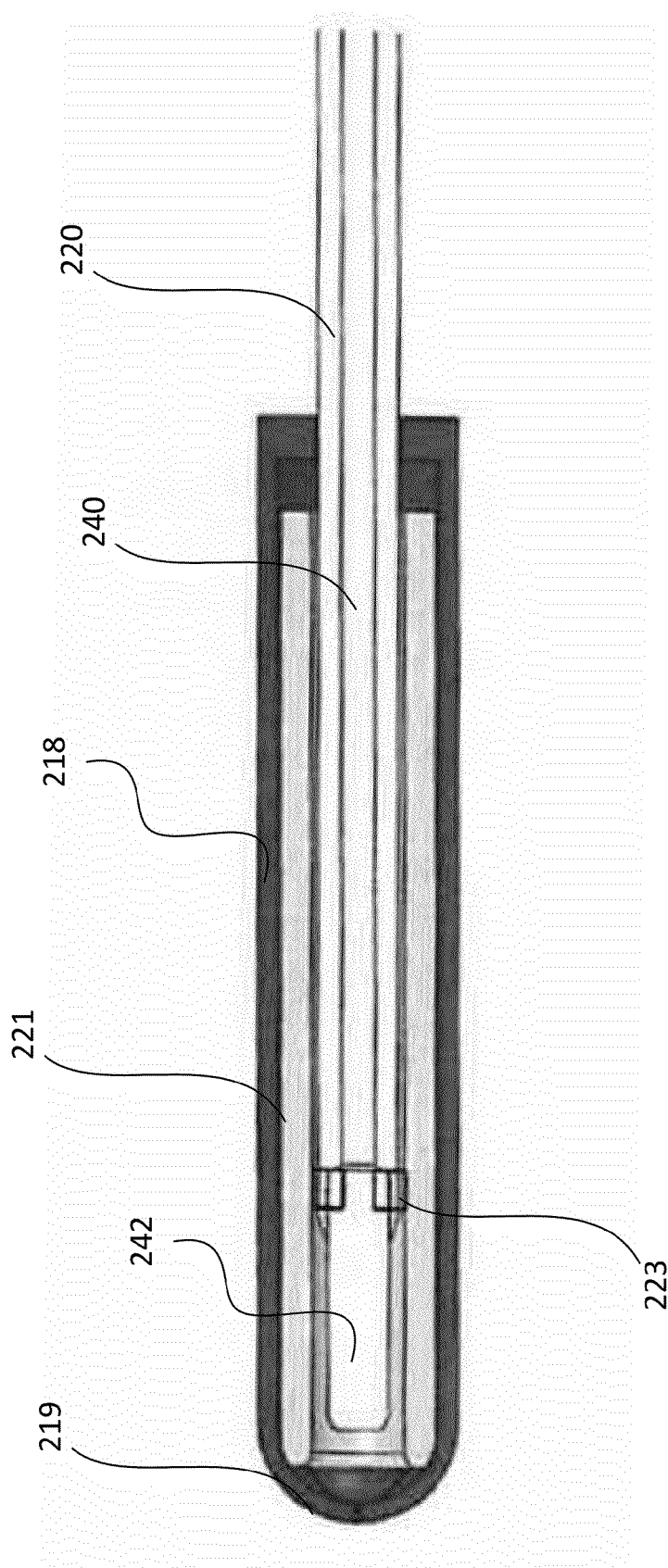
FIG. 8 provides a longitudinal cross-sectional view of an embodiment of the catheter seal of FIGS. 6 and 7 installed on an optical stem according to the present invention.

A catheter seal can optionally be provided on one, both, or neither of optical fiber stems 140/240. FIG. 8 illustrates a catheter seal 218 placed on receptacle fiber 240, but is functionally similar to the catheter seal 118 on plug fiber 140 shown in FIG. 10. The cross-section view of the receptacle catheter seal 218 shown in FIG. 8, illustrates the components that may comprise either the plug catheter seal 118 or the receptacle catheter seal 218. The receptacle catheter seal 218 has a convex end 219. The receptacle catheter seal 218 further comprises a catheter inner support 221, and a catheter fiber guide 223. The support 221 and fiber guide 223 keep the receptacle catheter seal 218 from deforming or exerting excessive force on the receptacle optical fiber ferrule 242 of the receptacle optical fiber stem 240 contained in the fiber sheath 220, and also keep the receptacle optical fiber ferrule 242 in the proper mating position.

Figure 9:
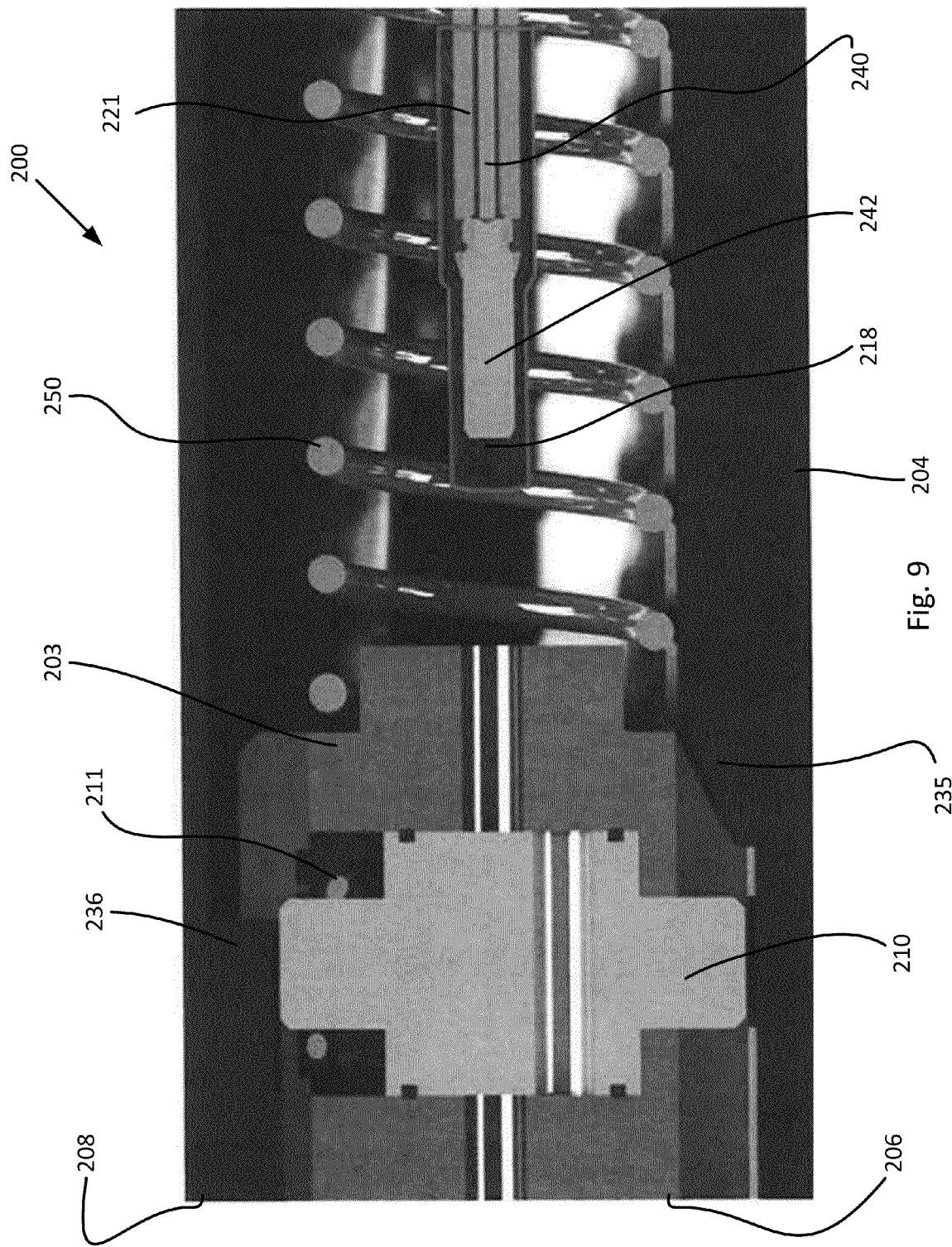
FIG. 9 provides a longitudinal cross-sectional view of an embodiment of primary, secondary and tertiary seals installed in a connector unit according to the present invention.

With reference now to FIG. 9, a cross-section render of the receptacle 200 with receptacle catheter seal 218 is provided. The receptacle body 203 sits within the receptacle housing 204 and, upon being forced during the mating process by plug 100, moves along the longitudinal axis of the receptacle 200 against the biasing force of the receptacle main spring 250 towards the receptacle optical fiber ferrule 242 of the receptacle optical fiber stem 240. The end of the receptacle optical fiber stem 240 is encapsulated in the receptacle catheter seal 218. The receptacle primary seal 210 is held in a normally closed position by the receptacle seal spring 210. When moving inwardly, the receptacle primary seal 210 moves past the receptacle housing forward seal stop 236 and comes into contact with the receptacle housing inclined ramp or cam portion 235 causing primary seal 210 to move from a closed position to an open position the primary seal 210 is actuated radially perpendicular to the longitudinal axis of the receptacle 200 (shown in greater detail in FIGS. 13 and 14).

Figure 10:
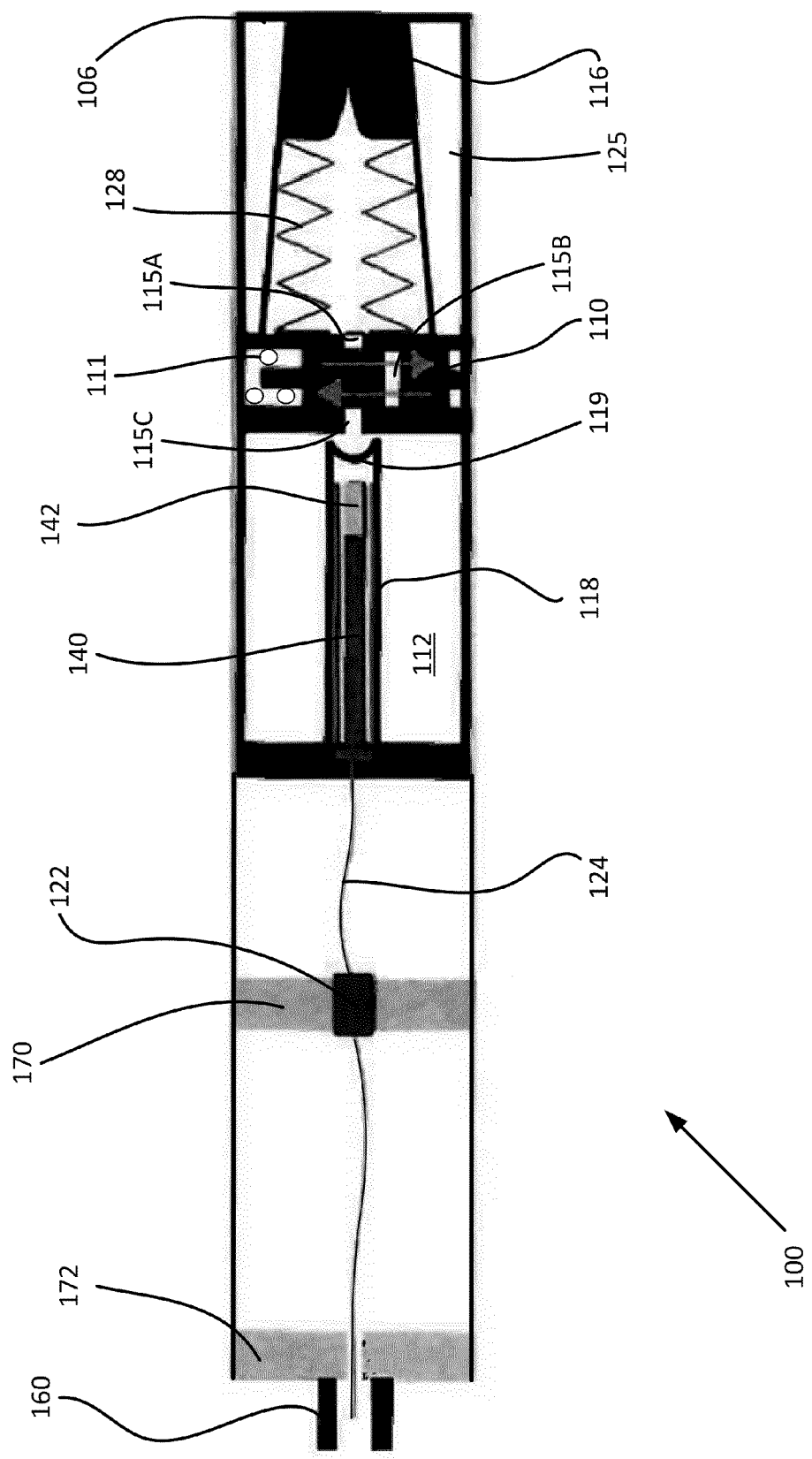
FIG. 10 illustrates an embodiment of the location of a bi-directional optical penetrator in the connector according to the present invention.

With reference now to FIG. 10, a cross-section diagram of the plug 100 is provided. Prior to the connector halves, plug 100 and receptacle 200, coming into contact during mating (shown in greater detail in FIGS. 13 and 14), the plug secondary seal 116 excludes or mitigates or reduces environmental debris. In this condition the catheter seal 118 is closed, providing an additional layer of protection for the optical fiber ferrule 142. During mating the plug 100 is received into the receptacle housing 204 and the plug secondary seal 116 compresses, within the pressure compensated fluid 125 and the optical fiber ferrules 242 moves toward plug optical fiber 140. If an optional catheter seal 218 is used, at some point the receptacle optical fiber ferrule 242 extends out through the slits in the convex end 219 of the receptacle catheter seal 218. Ferrule 242 engages plug catheter seal 118 at catheter end 119 deflecting inward the slits in the end 119 of the plug catheter seal 118. The process of extending the receptacle optical fiber ferrule 242 through the catheter seals 218 and 118 also provides a means to wipe the receptacle optical fiber ferrule 242 end face clean prior to optical contact.

A bi-directional optical penetrator 122 is located in the plug 100. For example, a hermetic penetrator developed by Teledyne ODI qualified to tolerate single direction pressure of 69.0 MPa and a temperature range of −40 degrees C. to 70 degrees C. Optical penetrator 122 ensures reliable fiber transmission through a bulkhead, such as plug interior barrier 170 and plug rear barrier or end 172, or other structure and may support, for example, up to twelve optical fibers. In the embodiment shown, a single cable optical fiber 124 is received in the plug rear 172 and passes through the optical penetrator 122 and is also protected by the cable protective layer 160 in the exterior of the plug 100.

Figure 11:
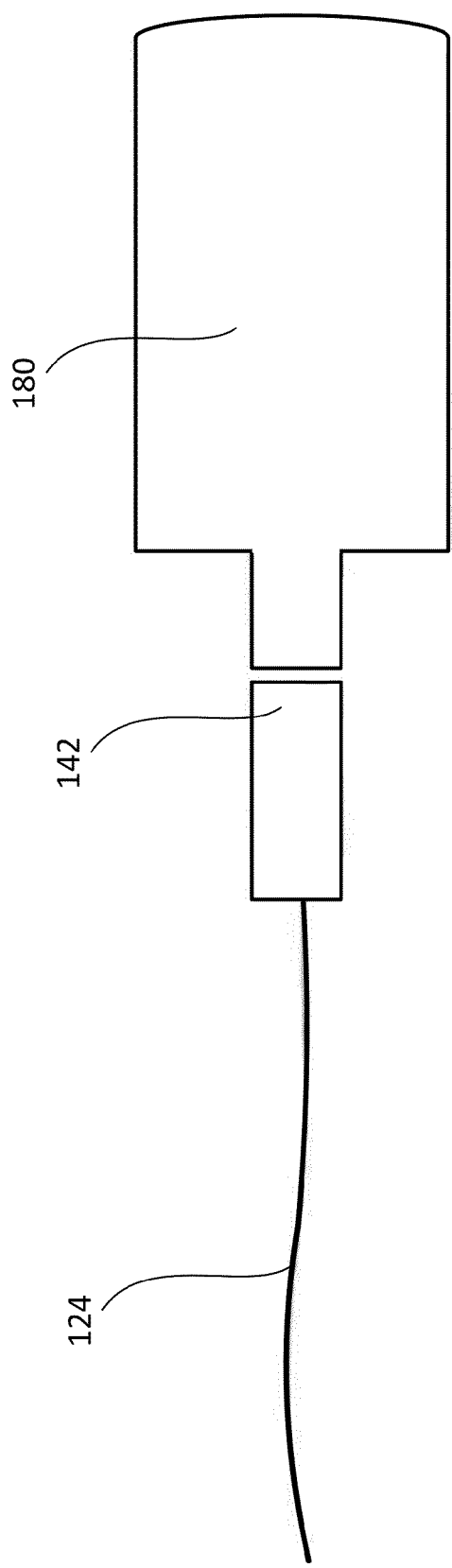
FIG. 11 illustrates an embodiment of a solid waveguide fiber termination concept for use in the connector of FIGS. 1 to 10 according to the present invention.

With reference now to FIG. 11, an optional waveguide embodiment is shown having plug optical fiber ferrule 142 connected to cable fiber 124 terminates to a solid waveguide 180. A solid waveguide termination provides high tensile strength splices at the joining point of the glass, as well as a large guide (taking the place of the fiber ferrule system) aligning with the opposing connector side. FIG. 11 provides a simple schematic of the step up components of the solid waveguide concept. Bare fiber is bonded through a fusion process to a fiber diameter step. This fiber diameter step is then fused to the waveguide using a special fusion splicing process. For example, materials depicted in FIG. 11 may be fused silica (glass). Once the large diameter waveguide is manufactured, it is rigidly secured to a metal tube for installation in the plug 100.

Figure 12:
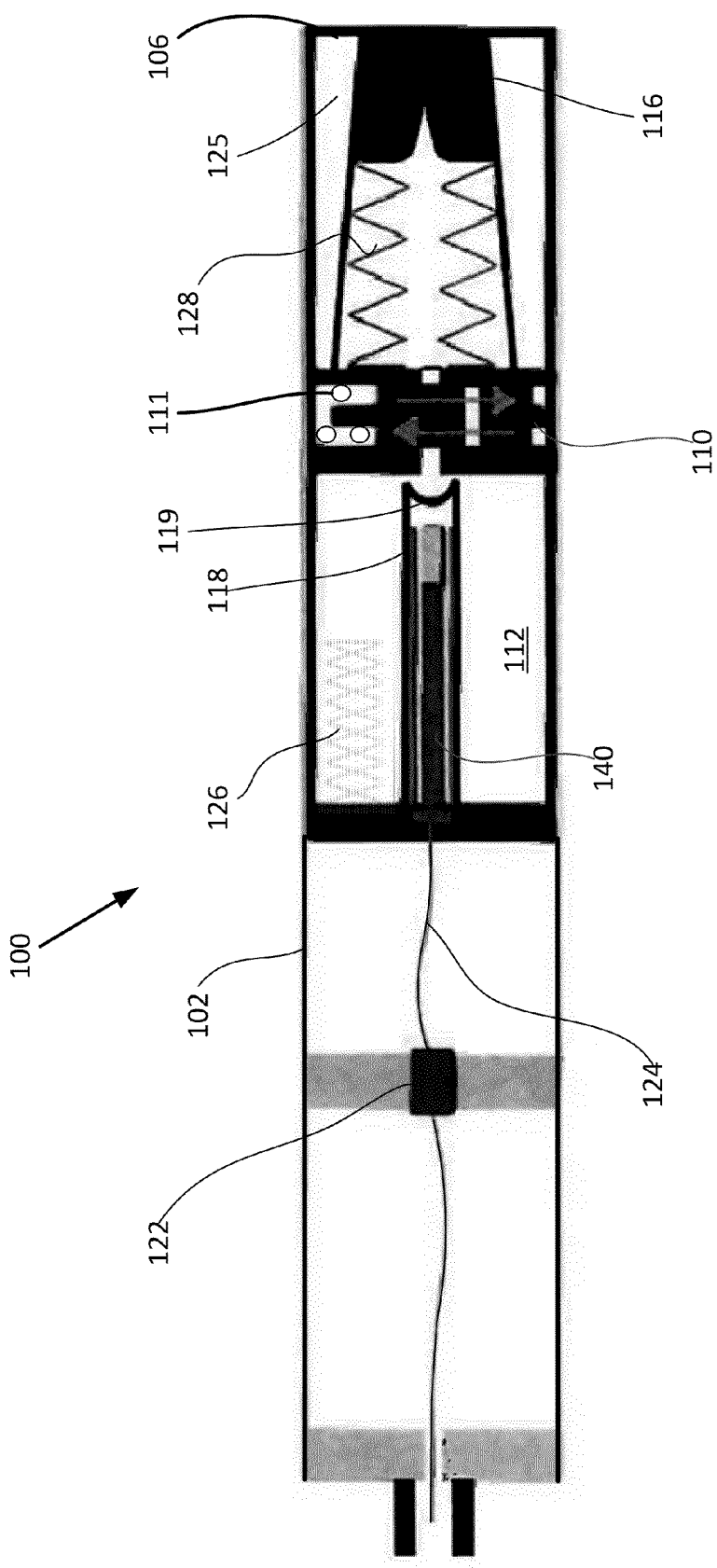
FIG. 12 illustrates an embodiment of an example of a pressure compensation arrangement in the connector assembly according to the present invention.

With reference now to FIG. 12, a cross-section diagram of the plug 100 having a plug pressure compensation bellows 126 is provided. Pressure compensation inside the plug optical oil containment vessel 112 is accomplished in two ways. Due to the redundant seal design for the plug 100 assembly, in a closed and unmated condition there are two volumes of oil, plug optical oil containment vessel 112 and plug forward oil containment vessel 125, separated by plug primary seal 110. The plug optical oil containment vessel 112 uses a plug pressure compensation bellows 126, which may be an Inconel bellows, for pressure compensation. The volume of oil in plug forward oil containment vessel 125 where the I-CONN plug secondary seal 116 is located has integral elastomeric ribs 128 for pressure compensation. This type of compensation was provided for the entire connector in the prior I-CONN connector referenced above.

FIGS. 13 and 14 illustrate the OFS plug and receptacle connectors 100/200 in a mated condition, and the assembled wet-mate connector unit 400 is shown comprising plug 100 and receptacle 200, including the components and technologies discussed above. FIGS. 13 and 14 each show simplified mating between two wet-mate connector halves, plug 100 and receptacle 200.

As shown in the exemplary embodiment of FIG. 13 and FIG. 14, initially during the mating of the front end of the plug face 106 and plug secondary seal 116 of the plug 100 contact the receptacle front end 206 of the receptacle body 203 which houses the receptacle primary seal 210 in the receptacle 200. As plug 100 is pushed into the receptacle 200, the receptacle body 203, receptacle primary seal 210, and oil containment volume 212 move inwardly along the longitudinal axis of the receptacle 200 within the interior of the housing 204. The plug 100 moves inwardly into the receptacle housing 204, and the receptacle housing annular leading edge 208 extends over the exterior of the plug 100, with the plug secondary seal 116 pressing on the receptacle face 206 of the receptacle body 203.

When the plug 100 has moved the receptacle body 203 inwardly past the receptacle housing forward seal stop 236 to the receptacle housing inclined ramp portion 235, and the pressure in the plug optical oil containment vessel 112 is equalized with the pressure in the plug forward oil containment vessel 125 and receptacle oil containment vessel 212, the receptacle primary seal 210 will actuate radially, bringing the offset bore, or mating sub-path 215B in the receptacle primary seal 210 in line with the receptacle fiber mating sub-paths 215A and 215C, forming receptacle fiber mating path 215, and openings of the plug secondary seal 116. As the receptacle body 203 continues inward the plug primary seal 110 will move past the receptacle housing forward seal stop 236 and into mechanical contact with the receptacle housing inclined ramp portion 235. This will radially actuate the plug primary seal 110 in a similar manner to the receptacle primary seal 210. A plug body recess 103 allows the plug 100 to proceed inwardly into the receptacle 200 until the plug optical fiber ferrule 142 and receptacle optical fiber ferrule 242 have come into optical contact at the fiber abutment point 300.

Each of the primary seals, plug primary seal 110 and receptacle primary seal 210, are actuated radially by mechanical interaction with the interior surface of the receptacle housing inclined ramp portion 235. While in the exemplary embodiment the actuation mans is the receptacle housing inclined ramp portion 235 of the interior of the receptacle housing 204 operating on a protrusion on the exterior of the primary seals, it should be understood that the invention is not limited to the particular configuration. Any suitable means to actuate seals 110/210 is all that is required. The receptacle housing inclined ramp portion 235 first operates on the receptacle primary seal protrusion 213 and then the plug primary seal protrusion 113, to actuate the seals 210 and 110 respectively, against the force of the springs 211 and 111 respectively. As seals 210 and 110 are actuated radially from a closed position to an open position, the receptacle optical fiber stem 240 moves through the receptacle catheter seal 218 and the fiber mating paths 215 and 115 of the seals 110 and 210, respectively, to close an optical circuit at the fiber abutment point 300.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and is only limited based on the appended claims that follow.

What is claimed is:

1. A wet-mateable connector assembly comprising:
   a receptacle having a front and a longitudinal axis extending inwardly from the front;
   a plug having a front, at least a portion of the plug adapted to be releasably received in the receptacle in a mating and de-mating fashion along the receptacle longitudinal axis;
   the receptacle further comprising:
      a receptacle housing forming an interior;
      a receptacle manifold movably disposed within the receptacle housing interior and having a first optical fiber mating path disposed therein extending inwardly from the front of the receptacle;
      a receptacle primary seal having a second optical fiber mating path disposed therein; and
      a receptacle optical fiber having a receptacle fiber contact end proximate to the receptacle front;
   the plug further comprising:
      a plug manifold having a third optical fiber mating path disposed therein extending inwardly from the front of the plug;
      a plug primary seal member, the plug primary seal member having a fourth optical fiber mating path disposed therein; and
      a plug optical fiber having a plug fiber contact end proximate to the plug front;
   wherein in an unmated condition the first optical fiber path and the second optical fiber path are misaligned, and the third optical fiber path and the fourth optical fiber path are misaligned; and
   wherein mating of the plug with the receptacle causes: the receptacle housing to engage and displace the receptacle primary seal; the second optical fiber mating path to align with the first optical fiber mating path and form a first uninterrupted optical fiber mating path extending through the receptacle manifold and the receptacle primary seal; the receptacle optical fiber to travel into and through the first uninterrupted optical fiber mating path; the receptacle housing to engage and displace the plug primary seal; the fourth optical fiber mating path to align with the third optical fiber mating path and form a second uninterrupted optical fiber mating path extending through the plug manifold and the plug primary seal; the receptacle optical fiber to travel into and through the second uninterrupted optical fiber mating path; and the receptacle fiber contact end to adjoin the plug fiber contact end to form a communication connection.

2. The wet-mateable connector assembly of claim 1 wherein the plug further comprises a secondary seal disposed intermediate of the plug front and the plug primary seal.

3. The wet-mateable connector assembly of claim 1 further comprising one or more of a tertiary seal adapted to substantially encapsulate one or both of the plug fiber contact end and the receptacle fiber contact end.

4. The wet-mateable connector assembly of claim 3 wherein the one or more of a tertiary seal comprises an I-CONN seal.

5. The wet-mateable connector assembly of claim 3 wherein the one or more of a tertiary seal are adapted to open upon engagement of an external contact end during the mating process.

6. The wet-mateable connector assembly of claim 1 wherein one or both of the plug and the receptacle further comprise an oil containment vessel adjacent to, respectively, the plug primary seal and the receptacle primary seal.

7. The wet-mateable connector assembly of claim 5 wherein the receptacle comprises a receptacle oil containment vessel and the plug comprises a plug oil containment vessel and one or both of the receptacle and plug oil containment vessels comprise a pressure compensation bellows.

8. The wet-mateable connector assembly of claim 1 wherein one or both of the plug primary seal and the receptacle primary seal comprises a spring adapted to bias the respective seal to a closed position and an interrupted fiber mating path.

9. The wet-mateable connector assembly of claim 1 wherein said receptacle seal member comprises a spring adapted to move said receptacle seal member from said second, open position to said first, closed position.

10. The wet-mateable connector assembly of claim 1 further comprising a set of bi-directional optical penetrators.

11. The wet-mateable connector assembly of claim 1 wherein the receptacle housing is substantially cylindrical in shape.

12. The wet-mateable connector assembly of claim 1 wherein the receptacle further comprises an inclined ramp portion disposed in the interior and adapted to engage both the plug primary seal and the receptacle primary seal during the mating process and to disengage both the plug primary seal and the receptacle primary seal during the de-mating process.

13. A wet-mateable connector assembly comprising:
   a plug adapted to mate and de-mate with a receptacle;
   the receptacle comprising:
      a receptacle housing forming an interior;
      a receptacle body disposed within the receptacle housing interior and linearly displaceable from a front of the receptacle and having a first optical fiber mating path disposed therein;
      a receptacle primary seal means having a second optical fiber mating path disposed therein; and
      a receptacle optical fiber having a receptacle fiber contact end proximate to the receptacle front and fixed relative to the receptacle housing;

the plug comprising:
- a plug body having a third optical fiber mating path disposed therein extending inwardly from a front of the plug;
- a plug primary seal means having a fourth optical fiber mating path disposed therein; and
- a plug optical fiber having a plug fiber contact end proximate to the plug front and fixed relative to the plug;
- wherein in an unmated condition the first optical fiber path and the second optical fiber path are misaligned, and the third optical fiber path and the fourth optical fiber path are misaligned; and
- wherein mating of the plug with the receptacle causes: the receptacle housing to engage and displace the receptacle primary seal means and align the second optical fiber mating path with the first optical fiber mating path to form a first uninterrupted optical fiber mating path; the receptacle optical fiber to travel into and through the first uninterrupted optical fiber mating path; the receptacle housing to engage and displace the plug primary seal means and align the fourth optical fiber mating path with the third optical fiber mating path to form a second uninterrupted optical fiber mating path; the receptacle optical fiber to travel into and through the second uninterrupted optical fiber mating path; and the receptacle fiber contact end to adjoin the plug fiber contact end to form a communication connection.

14. The wet-mateable connector assembly of claim 13 wherein the plug further comprises a secondary seal disposed intermediate of the plug front and the plug primary seal means.

15. The wet-mateable connector assembly of claim 13 further comprising one or more of a tertiary seal adapted to substantially encapsulate one or both of the plug fiber contact end and the receptacle fiber contact end.

16. The wet-mateable connector assembly of claim 13 wherein one or both of the plug and the receptacle further comprise an oil containment vessel adjacent to, respectively, the plug primary seal means and the receptacle primary seal means.

17. The wet-mateable connector assembly of claim 13 wherein the receptacle comprises a receptacle oil containment vessel and the plug comprises a plug oil containment vessel and one or both of the receptacle and plug oil containment vessels comprise a pressure compensation bellows.

18. The wet-mateable connector assembly of claim 13 wherein one or both of the plug primary seal means and the receptacle primary seal means comprises a spring adapted to bias the respective seal to a closed position and an interrupted fiber mating path.

19. The wet-mateable connector assembly of claim 13 wherein the receptacle further comprises an inclined ramp portion disposed in the interior and adapted to engage both the plug primary seal means and the receptacle primary seal means during the mating process and to disengage both the plug primary seal means and the receptacle primary seal means during the de-mating process.

\* \* \* \* \*